United States Patent [19]

Beidel et al.

[11] 3,721,770

[45] March 20, 1973

[54] SEQUENTIAL GATING CIRCUIT

[75] Inventors: Robert Gary Beidel, Reynoldsburg; Thomas Victor Burns; John Mason Catterall, both of Columbus, all of Ohio

[73] Assignee: Bell Telephone Laboratories, Incorporated, Murray Hill, N.J.

[22] Filed: June 22, 1971

[21] Appl. No.: 155,427

[52] U.S. Cl. ....................................................179/27 D

[51] Int. Cl. ....................................................H04m 3/60

[58] Field of Search ..........................179/27 D, 27 DA

[56] References Cited

UNITED STATES PATENTS 3,557,317 1/1971 Porter....................................179/27 D

*Primary Examiner*—Ralph D. Blakeslee

*Attorney*—R. J. Guenther et al.

[57] ABSTRACT

A system is disclosed for automatically distributing calls from groups of incoming lines through crossbar switch line and trunk link frames to teams of operator positions under control of markers. Sequential line gating circuits continually monitor the trunk link frames for idle trunks to operator positions and compare the number of such frames having idle trunks with the number of line link frames enabled to bid for service by the markers for establishing call connections to operators. The gating circuits include scanners that sequentially examine and then gate each of the line link frame requests for markers only after the comparison indicates that more trunk link frames have idle position trunks than there are line link frames gated to bid for service by markers.

21 Claims, 5 Drawing Figures

INVENTORS: R.G. BEIDEL
T. V. BURNS
J. M. CATTERALL
BY Frederick W. Padden
ATTORNEY

SEQUENTIAL GATING CIRCUIT

BACKGROUND OF THE INVENTION

This invention relates to switching systems and particularly to sequential gating facilities used in such systems for reducing undesired operations of common control and peripheral circuits in attempting to complete calls through a switching network to unavailable circuits.

Present day systems customarily centralize a substantial portion of their control functions in circuits which are common to the main switching network and the peripheral trunk and service circuits. The centralization proves advantageous because the holding times of the common control circuits are relatively short and their speed of operation is sufficiently high that they prove to be economical vehicles for speedily and efficiently controlling establishment of call connections through a switching network.

Such common control facilities are used, for example, in telephone systems for controlling the switching of a plurality of different classes-of-calls from incoming line circuits to trunks or service circuits that are selectively arranged to serve some or all of the classes-of-calls. The different classes-of-calls served illustratively in a known automatic call distributor switching system include local and toll directory assistance classes, a department store ordering class, and an airline reservation class.

In a known common control crossbar switching system used for automatic call distribution, the incoming lines are terminated on a plurality of line link frames and operator position facilities terminate on a lesser plurality of trunk link frames. Common control marker circuits in such a system are responsive to received calls on line link frames for testing trunk link frames for idle position trunks and for subsequently controlling the establishment of call connections through the line and trunk link crossbar switch frames between calling lines and idle testing position trunks. To prevent interference, only one marker at a time is enabled to control a trunk link frame.

A problem in such prior art arrangements is that undesired marker and peripheral circuit operations occur when a number of line link frames engage markers to serve calls within the same class and a fewer number of trunk link frames have at least one idle position trunk to serve that class-of-call. In such a situation, at least one of the engaged markers cannot successfully complete call connections without excessive holding time because it cannot concurrently operate with another marker to control the same one of the trunk link frames having a desired idle position trunk. As a result, undesired peripheral circuit operations occur for initially engaging the marker and for causing it to test the trunk link frames for idle position trunks arranged to serve the specified class-of-call. Obviously, such operations are inefficient, increase power consumption and circuit holding times and impair traffic patterns for circuit usage.

SUMMARY OF THE INVENTION

In accordance with principles of our invention, the foregoing problem and deficiencies are eliminated by a specific illustrative embodiment comprising a sequential line gating circuit which insures that a line link frame is only enabled to bid for common control facilities after it is determined that the number of trunk link frames with idle trunks or outgoing lines is greater than the number of line link frames then enabled to be served by the common control facilities. Each sequential line gating circuit includes circuitry for continually monitoring each of the trunk link frames to determine if that frame has an idle trunk for serving a specific class-of-call. Apparatus is controlled by the monitoring circuitry for accumulating the number of trunk link frames having idle trunks. The accumulated number is applied to a comparator in the gating circuit for comparison with the number of line link frames then enabled to be served by the common control facilities. The latter number is derived by the gating circuit in its sequential enabling of the line link frames to bid for the common control facilities.

Each of the line link frames activates a register in the gating circuit to identify when that frame has a specific class-of-call awaiting service. A scanner in the gating circuit is operable to examine sequentially each of the line link frames to ascertain if it has registered that a call is awaiting service on that frame. The scanner is only operated to perform such frame examination as long as the comparator indicates that the number of trunk link frames with idle trunks is greater than the number of line link frames enabled by the gating circuit to be served by markers.

If a line link frame has no registered call awaiting service, the scanner proceeds from its examination of that frame to a succeeding frame. When the scanner finds a registered call awaiting service on a line link frame, it gates or enables that frame to bid for an idle common control circuit. The bid is recognized by conventional peripheral preference and connector circuitry which then connects an idle common control circuit to the gated frame with the call awaiting service. Next, the control circuit obtains information including the class-of-call to be served and then engages the trunk link frames through other peripheral preference and connector circuits for testing those frames for a desired idle trunk. According to our invention, the control circuit is assured of finding at least one trunk link frame with a desired idle trunk as a result of the gating and testing operations and, therefore, is able to control the connection of the waiting call to the idle trunk via the line and trunk link frame network.

The foregoing and other objects, features and advantages of our invention are more fully understood from a reading of the following description with reference to the drawing in which.

Figure 3:
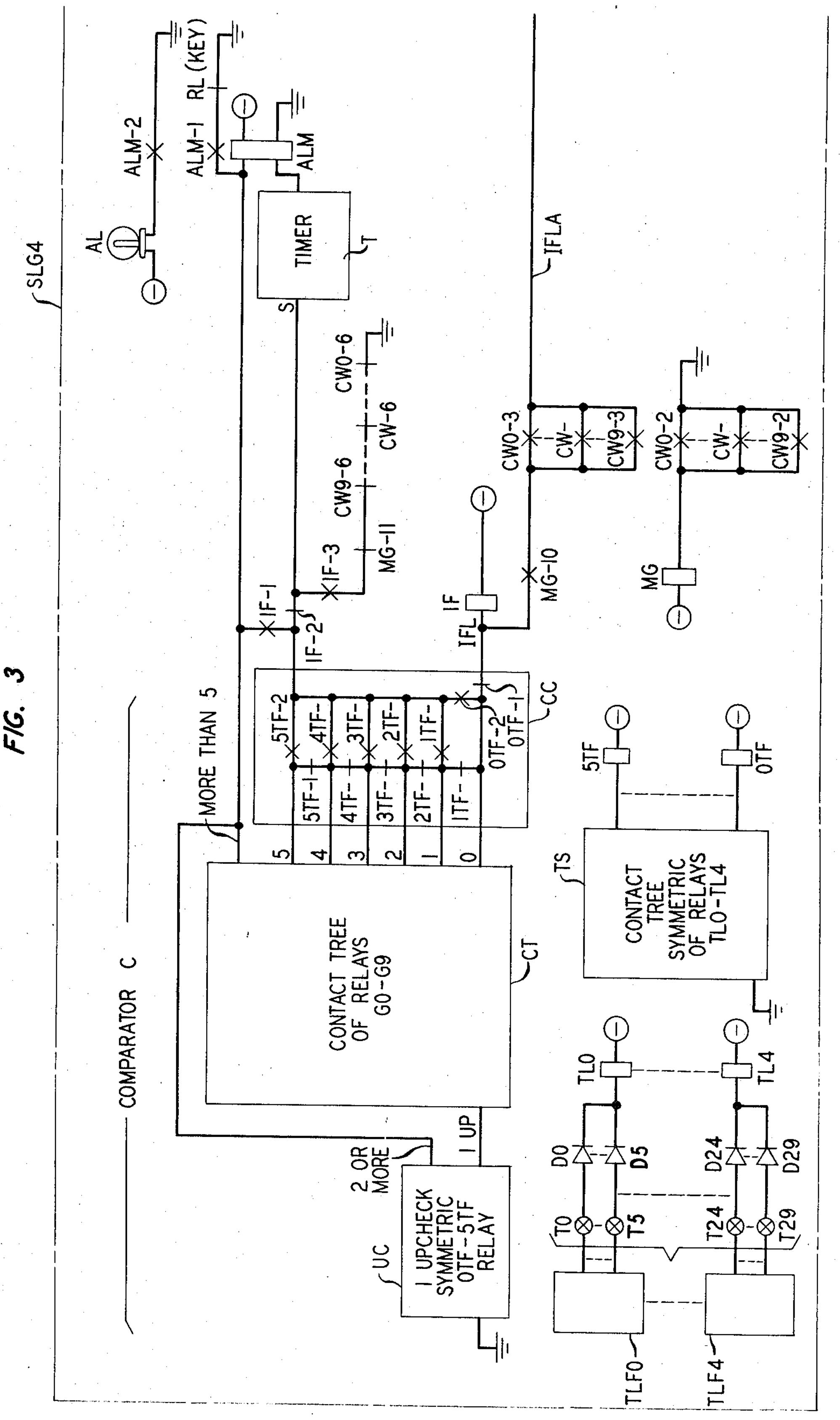
FIGS. 3 and 4 are schematic and block diagrams of a sequential line gating circuit.
Figure 4:
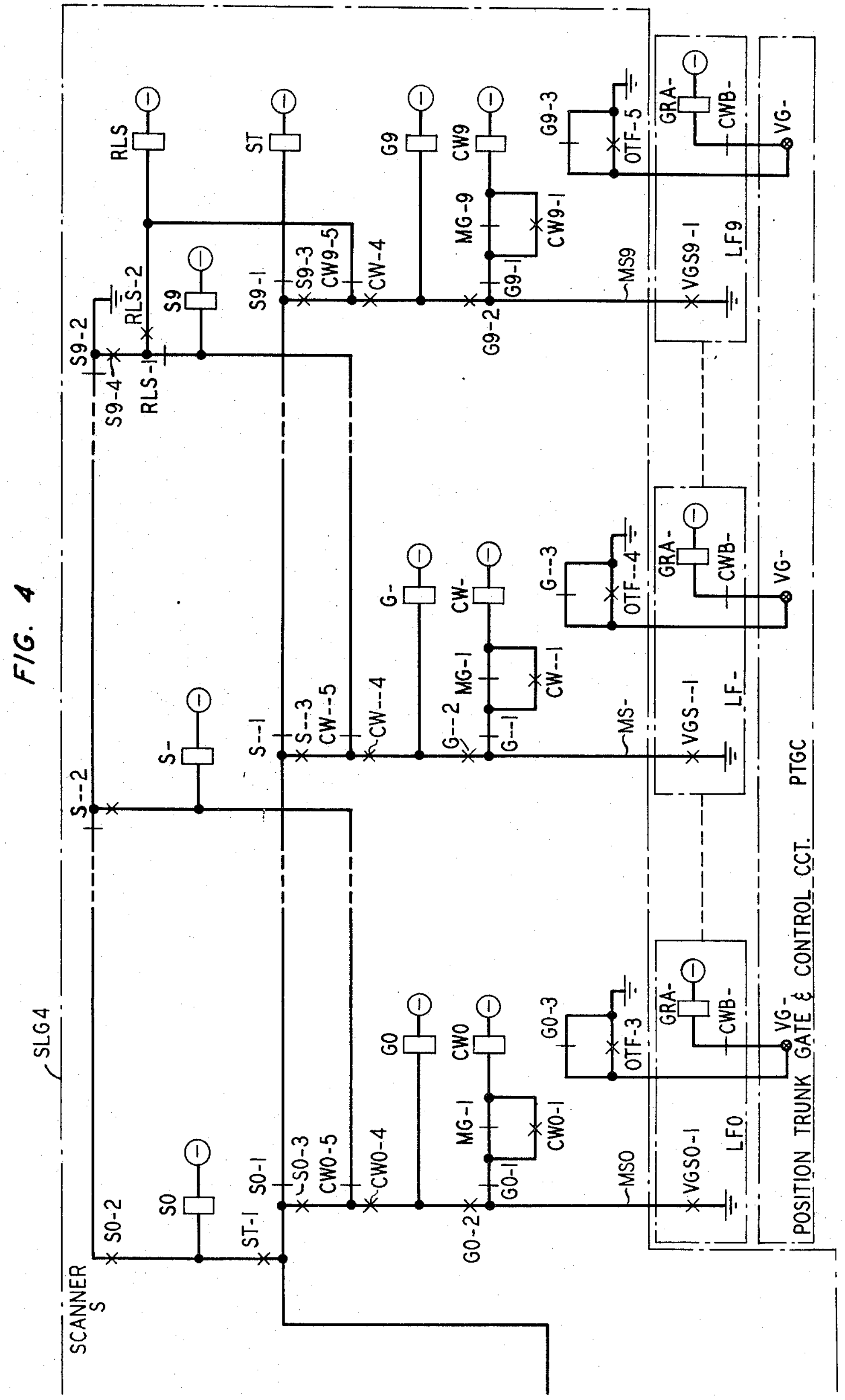

It is noted that FIGS. 3 and 4 employ a type of schematic notation referred to as "detached-contact" in which an X crossing a line represents a normally open contact of a relay and a bar crossing a line represents a normally closed contact of a relay; "normally" referring to an unoperated condition of a relay. The principles of this type of notation are described in an article entitled "An Improved Detached-Contact-Type Schematic Circuit Drawing" by F. T. Meyer in the September 1955 publication of the American Institute of Electrical Engineers (AIEE) Transactions, Communications and Electronics, volume 74, pages 505–513.

Each relay contact is designated in the drawing in a manner which indicates the relay of which it is a part as well as uniquely identifier it with respect to other contacts of the relay. For example, referring to relay contact ALM-1 in the upper right side of FIG. 3, it is noted that the ALM portion of the designation indicates that it is controlled by relay ALM of FIG. 3 and the "-1" portion uniquely identifies it with respect to other contacts such as ALM-2 of relay ALM, the latter contact also being shown in FIG. 3.

The equipment of the present invention may be advantageously incorporated, by way of example, in a crossbar telephone switching system wherein common control circuits, including markers, are employed to control the automatic distribution of calls from incoming lines to operator positions. One such system is disclosed in T. V. Burns et al., U.S. Pat. application Ser. No. 859,396, filed Sept. 19, 1969, now Pat. No. 3,643,034, Feb. 15, 1972. The latter patent incorporates equipment basically disclosed in A. J. Busch, U.S. Pat. No. 2,585,904 of Feb. 19, 1952. It is to be understood, however, that the present invention is not limited to use with a telephone system of this type, but that it may also be utilized with other types of switching systems.

The equipment illustrative of the principles of our invention has been embodied in a crossbar system of the type disclosed in the Burns et al patent. It is particularly concerned with the apparatus in the sequential line gating circuit shown in heavy lines in FIG. 1. The other equipment units are neither shown nor described in detail herein, except where necessary for a complete understanding of our invention. The Burns et al. and Busch patents, together with the other patent applications referred to therein, may be consulted for a complete understanding of the construction and operation of the units not covered in detail herein.

GENERAL DESCRIPTION

Figure 1:
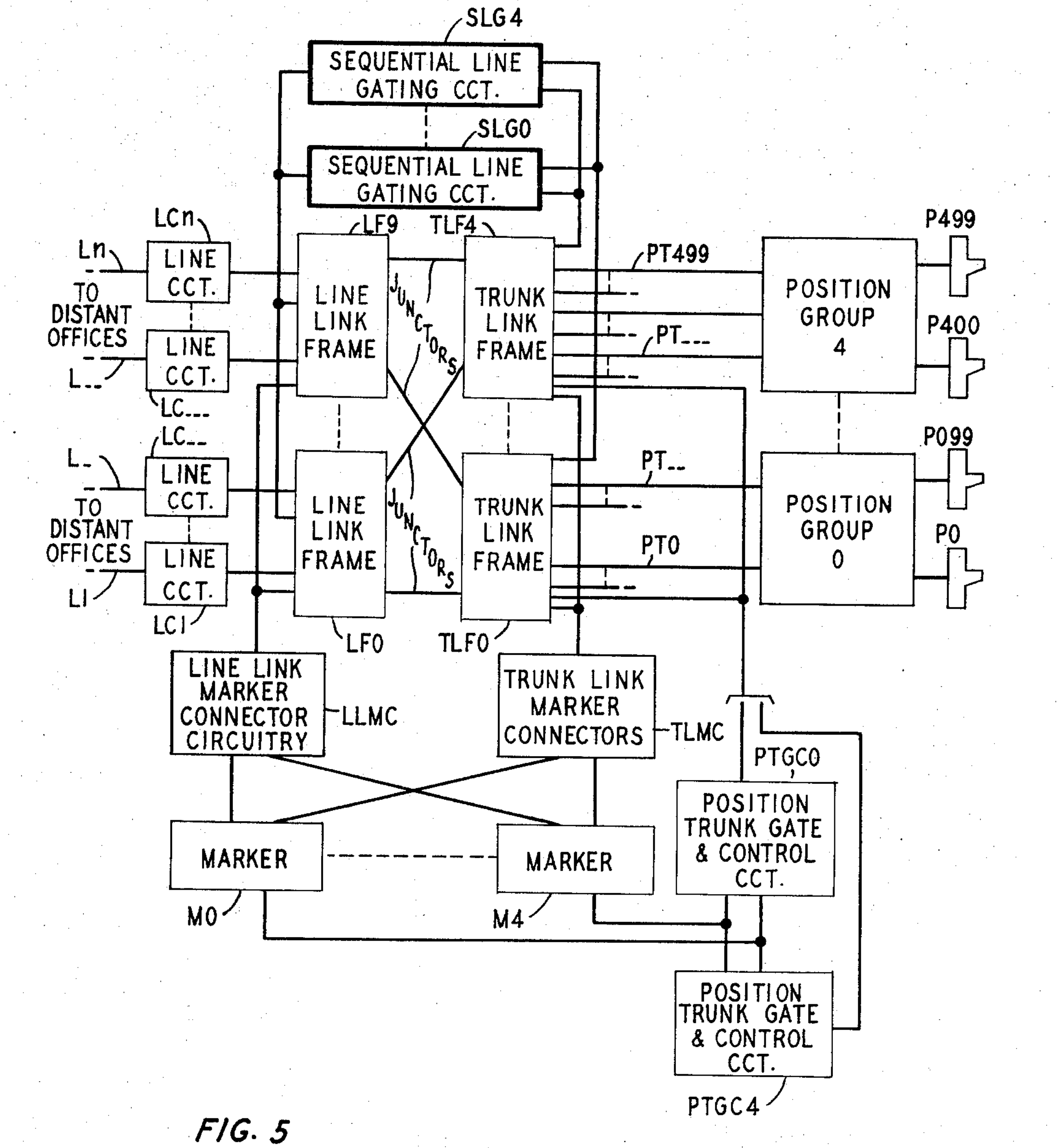
FIG. 1 shows, in block diagram form, an automatic call distributor (ACD) system in which the sequential line gating equipment specifically illustrative of our invention has been embodied.
Figure 5:
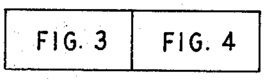
FIG. 5 depicts the position in which FIGS. 3 and 4 should be placed to show the cooperation between the circuit elements of a sequential line gating circuit.

Referring to FIG. 1, the switching network of the automatic call distributor (ACD) is arranged, by way of example, with 10 line link frames LFO–LF9 and 5 trunk link frames TLF0–TLF4 for terminating a maximum of 2,400 incoming lines and 600 trunks for operator positions and maintenance testing. The exemplary ACD receives calls on incoming line circuits LC1–LC*n* over lines L1–L*n* from distant offices such as those which serve local or tandem call traffic. Line circuits LC1–LC*n* terminate on the line link frames LF0–LF9 for the distribution of received calls to a maximum of 500 operator positions P0–P499 via position equipment including position trunks PT0–PT499 which terminate on the trunk link frames TLFO–TLF4.

In the illustrative ACD, a plurality of different classes-of-calls are distributed to operator positions and such positions are arranged in teams, or groups, each of which is equipped for serving one or more of the classes-of-call. Among the classes-of-calls are, by way of example, individual classes for local 411 and 555-1212 directory assistance calls, while the other classes are available for air line and department store services. An example of the use of this feature is the distribution of local information calls to operators who are equipped with local directories and toll information calls to operators with toll books. Line circuits LC1–LC*n* are segregated in groups on the line link frames LF0–LF9 and each such group serves one class-of-call. The identification of each class-of-call is derived by a marker from the locations of line circuits in crossbar switch horizontal groups, vertical groups and files on line link frames LF0–LF9.

Call distribution from line circuits LC1–LC*n* to the line and trunk link frames LF0–LF9 and TLF0–TLF4 to operator position trunks PT0–PT499 is under control of five marker circuits M0–M4. Each such marker has the ability to route calls five different ways and it determines the appropriate route from the physical equipment location of the calling lines within horizontal groups, vertical groups and vertical files on the crossbar switches of the line link frames. The line equipment location arrangement is used illustratively to provide five classes-of-call, or routes, for the ACD. Each team, or group, of operator positions is selectively arranged for serving one or more of the classes-of-calls. Each of the operator position trunks PT0–PT499 is terminated in a trunk block on the trunk link frames TLF0–TLF4. A trunk block may terminate one or more individual trunks for a plurality of the five different classes-of-calls.

Each incoming call is received in a line circuit, such as circuit LC*n*, and a request is immediately generated for a connection to an operator position assigned to serve that class-of-call. The request is served in the approximate order in which it is received, particularly with respect to other calls and under control of one of the sequential line gating circuits SLG0–SLG4.

In a prior art automatic call distributor, as disclosed in the Burns et al. patent, a maximum of 10 of the line link frames LF0–LF9 are allowed to bid concurrently for markers M0–M4 when a frame and position gate control circuit FPGC of Burns et al. FIG. 1 indicates that there is at least one operator position available on at least one of the trunk link frames for serving a class-of-call on the line link frames. In such a case, for example, 10 bids for five different markers M0–M4 are initiated through peripheral preference and control circuits and the markers start an operation of testing the trunk link frames for an idle position trunk which is equipped to serve the calls. As a result, there will be nine false starts for the markers MO–M4 because only one trunk link frame has an idle trunk. For the five line link frames capable of concurrently engaging the five markers for five different calls within the same class-of-call, there is only one trunk link frame having one idle position trunk for serving that class-of-call and only one of the engaged markers can be successful because only one trunk is available and only one marker at a time can operate within a trunk link frame. The remaining four markers encounter false starts because their tests for individual position trunks result in a determination that no trunk is available. Once such determinations are made, the latter four markers operate on the remaining five line link frames and similarly encounter false starts as long as only one trunk link frame has only one idle trunk. Consequently, the markers advance to disconnect themselves from serving those calls until a frame and position gate control circuit FPGC indicates that a position trunk of the desired class has become available.

In accordance with our invention, five gating circuits SLG0–SLG4 are substituted for the frame and position gate control circuit FPGC disclosed in FIG. 1 of the Burns et al. patent application. Each of the circuits SLG0–SLG4 serves an individual one of the five classes-of-call, or routes, switched through the ACD. Circuits SLG0–SLG4 are multiple connected to all of the line link frames LF0–LF9 and the trunk link frames TLF0–TLF4 for controlling the sequential gating of line requests through frames LF0–LF9 for markers M0–M4. Each of the circuits SLG0–SLG4 serving a specific class-of-call receives data from each of the outgoing link frames TLF0–TLF4 for identifying whether that frame has at least one idle operator position trunk for serving the same specific class-of-call. Each of the circuits SLG0–SLG4 also receives data from each of the incoming line link frames LF0–LF9 for identifying whether that frame is being served by or is in the process of being served by an idle one of the markers M0–M4. An individual comparator arrangement in each of the gating circuits SLG0–SLG4 makes a comparison to check whether the number of trunk link frames TLF0–TLF4 having at least one idle operator trunk is greater than the number of line link frames LF0–LF9 then in the process of or actually being served by markers M0–M4.

If the number is less, the comparator precludes additional ones of the line link frames for the same class-of-call from being enabled to bid, or start, for an idle one of the markers M0–M4. The reason for precluding the marker start is that call connections through the line and trunk link frames cannot be successfully established due to the unavailability of a trunk link frame having idle operator position to serve the class-of-call awaiting service. Thus, our illustrative embodiment eliminates the need in the latter situation for a line link frame to initiate a multitude of unnecessary circuit actions within a link link marker connector LLMC, markers M0–M4, trunk link marker connector TLMC, and trunk link frames TLFO–TLF4. Such circuit actions include, for example, a calling line link frame activation of a connector LLMC to establish connections to an idle marker M0–M4 and then the unsuccessful testing by that marker of all five trunk link frames TLF0–TLF4 for an idle operator position trunk on one of those frames.

If, on the other hand, the comparator determines that the number of trunk link frames with idle position trunks is greater than the number of line link frames then currently in the process of being served by the markers M0–M4, the comparator activates a scanner in the same sequential line gating circuit for successively scanning, or examining, each of the line link frames to ascertain whether it has calls awaiting marker service. Request for marker service for each of the five classes-of-call on all of the line link frames LF0–LF9 are registered in respective ones of the sequential line gating circuits SLG0–SLG4. The individual scanner in each of the circuits SLG0–SLG4, LF0 and ending with frame LF9. The scanning continues as long as frames LF0–LF9 have registered a call waiting request for marker service, and as long as the comparator indicates that there are more trunk link frames with idle positions than there are gated line link frames for service by markers M0–M4. Upon detecting a line link frame requesting marker service, the scanner enables that frame to bid, or start, for an idle one of the markers M0–M4. When enabled, a line link frame proceeds in a conventional manner to activate a line link marker connector LLMC for engaging an idle one of the markers M0–M4 to complete call connections from the calling line circuit through the line and trunk link frame network to an idle operator position including a position trunk and the position group circuitry.

DETAILED DESCRIPTION

Figure 2:
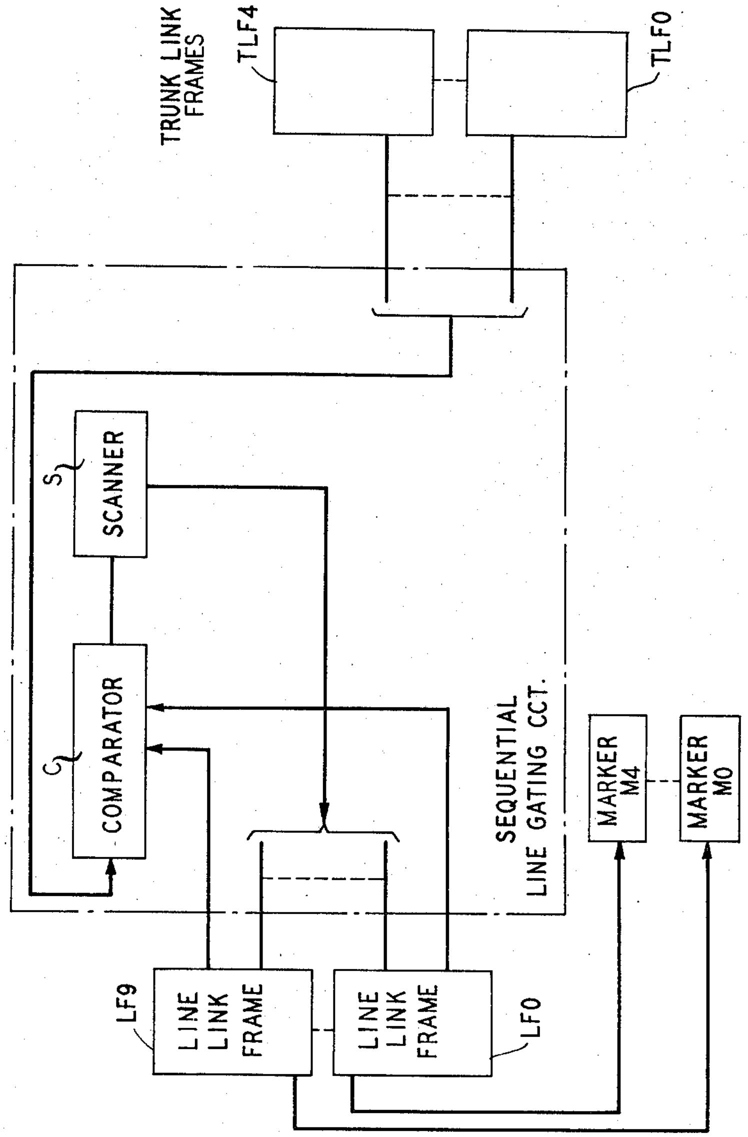
FIG. 2 is a block diagram of structural elements within a sequential line gating circuit.

Referring initially to FIG. 2, a description is presented of the basic building blocks of a sequential line gating circuit according to our invention. Each such circuit (of which there are illustratively five in the ACD of FIG. 1) is assigned solely to one of five classes-of-call 0–4 and comprises a comparator C and a scanner S. The sequential line gating circuit controls, or gates, line link frame requests for the markers M0–M4. It insures that false marker starts from those frames do not occur by gating each line link frame request so that it actually bids for a marker only after it is determined that there are more trunk link frames with an idle position trunk of the desired class than there are line link frames already gated and therefore enabled to be served by markers M0–M4.

Each of the trunk link frames TLF0–TLF4 supplies the comparator C with input data as to whether that frame has at least one idle position trunk for serving a class-of-call with which the sequential line gating circuit is individually associated. The comparator C derives other input data as to whether the line link frames LF0–LF9 are gated to bid for one of the markers M0–M4 on a call in the same class as that served by the sequential line gating circuit. Comparator C compares the input data and operates the scanner S only when a comparison indicates that there are more trunk link frames with idle position trunks for serving a class-of-call than there are gated line link frames requesting marker service for the same class-of-call. In operating, scanner S examines each of the line link frames LF0–LF9 in sequence. If no marker request is received from an examined line link frame, scanner S steps to examine a next line link frame until a marker requesting line link frame is found. Upon finding a marker requesting one of such frames, scanner S operates that frame to enable it to bid for an idle one of the markers M0–M4. Scanner S is maintained operated for performing the foregoing line link frame examining and enabling operations as long as the comparator C indicates that there are more trunk link frames with idle operator trunks of the desired class than there are line link frames gated for marker service. When the number of trunk link frames with idle trunks is less than the number of gated line link frames, comparator C releases the scanner S which then stops its examining operations at the next line link frame to be examined.

Referring now to FIGS. 3 and 4, the schematic details and operations are described illustratively for a sequential line gating circuit SLG4 which serves a class-of-call 4. The features of the gating circuit SLG4 may advantageously be explained by assuming initially that none of the line link frames LF0–LF9 is being served by one of the markers M0–M4 and that all trunk link frames TLF0–TLF4 have at least one operator position trunk available for serving a class-of-call 4. Under such conditions, circuit SLG4 is initially operated to register the identity of the frames TLF0–TLF4 which have the idle position trunks.

As shown in FIG. 3, each of the relays TL0–TL4 is connected to an individual one of the trunk link frames TLF0–TLF4 for registering, or monitoring, when that frame has at least one idle position trunk for serving a 4 class-of-call. Relays TLO–TL4 are connected to frames TLF0–TLF4 via diodes D0–D29 and crossconnection terminals T0–T29 for receiving idle position trunk indicating ground signals. As disclosed in the Burns et al. patent, the latter signals are supplied from 30 trunk blocks segregated in groups of six on each of the frames TLF0–TLF9. Each of six trunk blocks on each frame comprises operator position trunks for serving each of the five different classes-of-call 0–4.

Each of the terminals T0–T29 of FIG. 3 is individually associated with one of the 30 trunk blocks and illustratively is crossconnected to a so-called FTC terminal within the associated block for receiving a ground signal when an operator position trunk connected to that FTC terminal is idle and available for serving a 4 class-of-call. The circuitry and operations whereby the idle position trunk ground signal is applied to an FTC terminal may be understood by referring to FIGS. 14 and 16 of the Burns et al. patent application. The latter Figures illustrate how an idle position trunk PT499 in a trunk block 4 of trunk link frame TLF4 performs the idle trunk indicating function. As disclosed in Burns et al., position trunk circuit PTC499 of FIG. 16, when idle, applies a ground to its lead FT which extends to terminal FTC444 of FIG. 14 via crossconnections to terminal FT499. According to the present invention, terminal FTC444 is illustratively crossconnected to terminal T29 of FIG. 3 for extending the ground via diode D29 and through the winding of relay TL4 to negative potential for operating that relay and thereby signifying that frame TLF4 has at least one idle position trunk for serving a 4 class-of-call. The other frame relays TL0–TL3 are operated under control of similar circuit arrangements on the respective trunk link frames TLF0–TLF3.

The number of TL0–TL4 relays operated is accumulated and registered on the relays 0TF–5TF of FIG. 3 to indicate the total number of the frames TLF0–TLF4 having an idle position trunk for serving a 4 class-of-call. The accumulation is accomplished by a conventional contact tree symmetric TS of FIG. 3 which comprises contacts of the relays TLO–TL4 and causes one-out-of-the-six relays 0TF–5TF to be operated. Relay 0TF is operated when none of the frames TLF0–TLF4 has an idle operator trunk for a 4 class-of-call and none of the relays TL0–TL4 is operated. However, under the illustrative assumptions priorly established, relay 5TF is operated through symmetric TS because all five of the frames TLF0–TLF4 have idle position trunks for class 4 and all five of the relays TL0–TL4 are operated.

The operation of one of the relays OTF–5TF activates a comparator C of FIG. 3 for determining whether there are more trunk link frames with idle positions for class 4 calls than there are line link frames currently gated to, or being served by, markers M0–M4 on class 4 calls. Comparator C comprises a contact configuration CC including contacts on the 0TF–5TF relays which enable the accumulated number of trunk link frames with idle position trunks for class 4 to be compared with the number of line link frames concurrently gated to, or being served by, markers M0–M4 for completing call connections. The latter number is supplied by a conventional contact tree CT consisting of contacts on relays G0–G9, of FIG. 4, which relays, as hereinafter described, are operated when the line link frames are enabled, or gated, to bid for the services of markers M0–M4. An input ground signal is connected to contact tree CT from a conventional "1 upcheck" symmetric UC of the 0TF–5TF contacts when only one of the six relays 0TF–5TF is operated. The input ground is extended through the contact tree CT to one of its seven output leads 0–5 and "more than 5" each of which indicates an individual number of the line link frames actually gated, or being served by, markers M0–M4. Output lead 0–5 are connected to the contact configuration CC which compares the indicated number 0–5 with the accumulated trunk link frame number and further extends the ground to an idle frame lead TFL of FIG. 3 if, and only if, the comparison indicates that there are more trunk link frames with idle trunks for serving class 4 calls than there are line link frames already gated to, or being served by, the markers M0–M4.

A ground on the idle frame lead IFL causes the operation of relay IF over the obvious path and also activates scanner circuitry of FIG. 4 immediately upon the registration of a class 4 call waiting signal from one of the line link frames. Under the foregoing assumptions, for example, relay IF is operated over a path from its winding through lead IFL, contact 0TF–1 to ground on output lead 0 of the contact tree CT. In contrast, if output lead 5 of contact tree CT were grounded to indicate that five line link frames are currently gated to, or are being served by, markers M0–M4 in the establishment of call connections to the five trunk link frames, the ground signal is blocked from lead IFL by the contact configuration CC because the number of line link frames gated is equal to the accumulated number of five trunk link frames. Under the latter circumstances, relay 5TF is operated for activating its contacts 5TF-1 and 5TF-2 in configuration CC to block the idle frame indicating ground from being applied to lead IFL. As a result, gating circuit SLG4 prevents further gating of line link frames to markers M0–M4 because they are all busy.

Before proceeding with an explanation of how the comparator C activates the scanner circuitry of FIG. 4, it is advantageous to describe the manner in which the line link frames LF0–LF9 inform the gating circuit SLG4 when class 4 calls are awaiting service by markers M0–M4. As shown in FIG. 4, each of the frames LF0–LF9 indicates to circuit SLG4 that it has a class 4 call awaiting service by applying a ground to a respective MS0–MS9 lead via a contact VGS0-1 – VGS9-1 and for operating a correspondingly numbered one of the call waiting relays CW0–CW9 of FIG. 4. The latter contacts are controlled by the operation of relays VGS0–VGS9 (not shown herein, but illustrated in FIG. 7 of Burns et al.) incident to an identification of the calling line as disclosed in Burns et al.

The operations of the circuitry of FIG. 4 may be fully understood by assuming, for illustration, that line link frame LF9 has a call awaiting marker service and actuates contact VGS9-1 for completing the circuit through contacts G9-1 and MG-9 to operate relay CW9. In operating, relay CW9 immediately locks via contacts CW9-1, G9-1 and VGS9-1 to ground. Concurrently, relay CW9 closes its contact CW9-2 for operating a master gate relay MG of FIG. 3 over the obvious path. Upon operating, relay MG opens all of its contacts MG-1 through MG-9 to block line link frames subsequently requiring marker service from having their call waiting status registered on the relays CW0–CW8 of circuit SLG4.

Upon the operation of relays MG and CW9, the comparator of FIG. 3 is enabled to operate the scanner of FIG. 4 to locate a line link frame with a call awaiting service. Scanner S comprises start and release scanning relays ST and RLS as well as 10 scanner relays S0–S9 which control the examination of the line link frames to determine the 4 class-of-calls awaiting service by markers M0–M4. When relay MG operated as already explained, it causes the operation of the scanner start relay ST of FIG. 4 over a path from its winding through contacts S9-1, S--1, S0-1, lead IFLA, and contacts CW9-3 MG-10 to the ground supplied by comparator C to the idle frame lead IFL. The operation of relay ST controls the relays S0–S9 so that the scanner circuitry sequentially examines the call waiting status of the line link frames commencing with frame LF0 and progressing successively through to frame LF9. To elaborate, each of the relays S0–S9 examines the operated state of an individually associated one of the relays CW0–CW9 and, upon finding it operated, gates the correspondingly numbered one of the frames LF0–LF9 to enable it to request service by an idle one of the markers M0–M4.

When the start scanning relay ST operated, it causes the operation of relay S0 by completing the operate path from its winding through contact ST-1 to the ground on the idle frame lead IFLA of FIG. 3. In operating, relay S0 locks via its contact S0-2, break contacts S--2 of intermediate relays S-, and S9-2 to ground. Operated relay S0 also opens the operate path for relay ST at contact S0-1 and relay ST releases. The operation of relay S0 causes the call waiting status of frame LF0 to be examined by checking the operated status of relay CW0. If relay CW0 were operated, relay G0 would be operated for enabling it to gate frame LF0 so that it bids for an idle one of the markers M0–M4. Relay G0 in such a case operates in a path from its winding through contacts CW0-4 and S0-3 to the ground from lead IFLA of FIG. 3. However, since frame LF0 is assumed not to have calls waiting, the scanner immediately advances to examine the next frame LF2 upon the operation of relay S0. The latter operation extends the ground from lead IFLA through contacts S0–3 and CW0–5 to the winding of relay S1 (not shown) for causing its operation. Upon operating, relay S1 locks operated in a manner as described for relay S0 and concurrently opens the priorly described locking path for relay S0 to effect its release.

Since only frame LF9 is assumed to have a call waiting service, the scanner advances through its examination of frames LF0–LF8 to the point where the relays S0–S8 are operated, locked and released in essentially the same manner as described with respect to relays S0 and S1. The advance occurs to the point where relay S9 of FIG. 4 is operated to examine frame LF9 for calls awaiting service. Relay S9 operates over a path from its winding through break contacts of intermediate CW1–CW8 and S1–S8, and contact S0-1 to the ground on the idle frame lead IFLA. Upon operating, relay S9 locks via contacts RLS-1 and S9-4 to ground.

If line link frame LF9 had no call waiting upon the operation of relay S9, the scanner would immediately advance from an examination of frame LF9 to frame LF0. The latter action occurs by operating the scanner release relay RLS of FIG. 4 over a path from its winding through contacts CW9-5, 3, S--1 and S0-1 to the ground on lead IFLA. In operating, relay RLS locks via contacts RLS-2 and S9-4 to ground. The operation of relay RLS also causes the locking path of relay S9 to be opened at contact RLS-1 to effect its release. The release of relay S9 causes the reoperation of relay ST over the previously described path for reinitiating scanner operations with an examination of frame LF0 for calls awaiting marker service in a manner as already described.

Under the assumed circumstances, however, frame LF9 has a call awaiting marker service as indicated by the priorly described operation of relay CW9. Accordingly, when relay S9 operates, it causes the operation of relay G9 for gating frame LF9 so that it is enabled to bid for an idle one of the markers M0–M4. Relay G9 operates in a path from its winding through contacts CW-4, S9-3, S--1 and S0-1 to the ground on lead IFLA. In operating, relay G9 locks via contacts G9-2 and VGS9-1 to ground. The operation of relay G9 gates frame LF9 by opening the operate path for relay GRA-1 of FIG. 4 at contact G9-3 which then releases and enables frame LF9 to initiate a seizure or start for an idle one of the markers M0–M4 for serving the waiting class 4 calls on frame LF9.

It is advantageous to note at this point that each of the frames LF0–LF9 of FIG. 4 comprises a GRA- relay which is held operated under control of circuit SLG4 to block that frame from requesting service by a marker M0–M4 until after it is determined that the number of frames TLF0–TLF4 having idle position trunks is greater than the number of frames LF0–LF9 awaiting marker service. Illustratively, relay GRA- on frame LF9 is held operated over a path from its winding through a break contact of relay CWB- (not shown) on frame LF9, a crossconnection to a VG- terminal in a position trunk gating circuit as disclosed in Burns et al., and contact G9-3 to ground. Upon the opening of contact G9-3 as explained already, relay GRA- on frame LF9 releases for, in turn, releasing relay GRA- and thereby permitting the frame LF9 to bid for an idle one of the markers M0–M4 for serving waiting calls on that frame. Another feature of the gating circuit SLG4 is that the GRA- relays on all frames are immediately operated over the obvious path when circuit SLG4 operates its 0TF relay to indicate that none of the trunk link frames TLF0–TLF4 has an idle position trunk for serving a class 4 call. Such action precludes undesirable switching equipment operations involved in marker attempts to complete connections to a trunk link frame which has no trunk for serving the waiting call.

The circuitry of FIGS. 3 and 4 is arranged to stop a scanner examination of the line link frames LF0–LF9. The stopping occurs as soon as ground is removed from lead IFLA. The ground may be removed when no line link frame has registered a call waiting and accordingly the relays CW0–CW9 and MG are released to open their contacts in the series path between leads IFL and IFLA. The ground is also removed when the comparator C of FIG. 3 indicates that the number of the trunk link frames TLF0–TLF4 having idle position trunks is less than or equal to the number of line link frames gated for actually bidding for markers M0–M4. Illustratively, each of the relays S0–S9 locks, following its operation to effect an examination of a correspondingly numbered line link frame as already described. Thereafter, if ground if removed from lead IFLA further advancing of the scanner is stopped until the comparator C of FIG. 3 causes ground to be reapplied to lead IFLA.

A timer T and an alarm relay ALM are provided in FIG. 3 for detecting trouble conditions. A first trouble condition involves the operation of more than one of the 0TF–5TF relays at one time. Another trouble involves an indication of more than five of the line link frames being gated which means that all such gated frames are possibly enabled to bid concurrently for only the five markers M0–M4. When either of the latter troubles occurs, the alarm relay ALM is immediately operated in a path through its operate winding and (1) the "more than 5" output of the contact tree CT, the "1 up" output lead of the "upcheck" configuration UC to ground for a more than five trunk link frame trouble or (2) the "2 or more" up output and the configuration UC to ground for the more than one 0TF-5TF relays operated trouble.

Relay ALM is also operable from a false ground or shorted contact within the comparator contact configurations and under control of relay IF. Specifically, when relay IF is operated as already described and a false ground exists within the comparator C which falsely indicates that more line links frames are gated than there are trunk link frames with idle position trunks, the false ground is extended through contact IF-1 to the upper winding of relay ALM for operating it to indicate an alarm condition.

Relay ALM is further operable under control of a timer T of FIG. 3. A primary purpose of timer T is to detect when trunk link frames with idle trunks are available and calls are awaiting marker service, but are not served within the T timer timing interval. Under such conditions, a trouble in the scanner which prevents it from scanning the frames LF0–LF9 causes timer T to timeout and operate relay ALM. Following the operation of the idle frame relay IF as priorly described, its contact IF-2 is opened to disconnect a ground connectable to the timer start lead S under control of the comparator C, for example, via contact 5TF-2 when five trunk link frames have an idle trunk available. The operation of timer T generates a timed interval at the end of which a trouble condition is indicated by operating relay ALM through its lower winding.

Upon operating, relay ALM locks via its contact ALM-1 and a contact of a release key RL to ground. Operated relay ALM also energizes lamp al. via contacts ALM-2 to ground for providing maintenance personnel with an indication of the alarm condition. The alarm is subsequently retired when key RL is manually operated to effect the release of relay ALM.

It is to be understood that the hereinbefore described arrangements are illustrative of the application of principles of our invention. In light of this teaching, it is apparent that numerous other arrangements may be devised by those skilled in the art without departing from the spirit and scope of the invention.

What is claimed is:

1. A sequential gate circuit for a switching network having common control means for controlling the establishment of connections through said network, and said circuit comprising means monitoring a plurality of output link means of said network to determine the number of said link means having at least one idle output, means for gating each one of a plurality of incoming link means of said network to bid for said control means to control the establishment of connections from said one incoming link means to an idle output of said output link means, and means comparing the determined number of said output link means having at least one idle output with the number of gated ones of said incoming link means for controlling said gating means to enable said incoming link means to be sequentially gated to bid for said control means only when the number of said output link means with an idle output is greater than the number of said incoming link means gated to bid for said control means.

2. A sequential gate circuit in accordance with claim 1 further comprising an accumulator means cooperating with said monitoring means to determine the number of said output link means having at least one idle output, and means included in said comparing means and controlled by said accumulator means for indicating the determined number of said output link means having at least one idle output.

3. A sequential gating circuit in accordance with claim 1 further comprising means for registering requests received from said incoming link means for service by said common control means, means controlled by said comparing means for sequentially examining each of said incoming link means for a service request registered in said registering means, and said gating means being controlled by said comparing means for enabling each examined one of said incoming link means with a service request registered in said registering means to be sequentially gated to bid for said common control means only when said comparing means determines that the number of said output link means with an idle output is greater than the number of said incoming link means gated to bid for said control means.

4. In a switching system comprising a plurality of incoming link frames each having incoming lines terminated thereon, a plurality of output link frames each having output lines terminated thereon, each of said incoming and outgoing link frames having switch means operable for establishing call connections between calling ones of said incoming lines and available ones of said output lines, and common control means activatable for operating said switch means to establish said connections, the invention comprising means monitoring said output link frames for available ones of said output lines, means for gating each one of said incoming link frames to bid for said common control means to control the establishment of said connections from a calling one of said incoming lines on said one frame to an available one of said output lines on a monitored one of said output link frames, and means comparing the number of said monitored output link frames having at least one available output line with the number of each gated one of said incoming link frames for controlling said gating means to enable said incoming link frames with a calling one of said incoming lines to be gated to bid for said common control means only when the number of said output link frames with an available output line is greater than the number of said output link frames gated to bid for said common control means.

5. The invention according to claim 4 wherein said monitoring means comprises a register for registering when one of said output link frames has at least one available output line, and further comprising means activated by said register means for accumulating the number of said output link frames having at least one available output line, and means controlled by said accumulating means for supplying said comparing means with indications of said accumulated number of said output link frames.

6. The invention according to claim 5 wherein said gating means includes means for supplying said comparing means with indications of the number of said incoming link frames gated to bid for said common control means, means operable for examining said incoming link frames for a calling one of said incoming lines, and said comparing means responsive to said supplied number indications from accumulating means and said supplying means for operating said examining means when the number of said output link frames having at least one available output line is greater than the number of gated incoming link frames.

7. The invention according to claim 6 wherein said examining means comprises for each one of said incoming link frames, apparatus for registering when said last-mentioned one of said frames has a calling one of said incoming lines terminated thereon, means controlled by said comparing means and said registering apparatus for gating said last-mentioned one of said frames to bid for said common control means when the number of said output link frames having at least one available output line is greater than the number of gated incoming link frames.

8. An automatic call distributor system comprising a plurality of line link frames each having a plurality of individual groups of incoming lines terminated thereon, each of said groups serving an individual different class-of-call, a lesser plurality of trunk link frames each having trunks terminated thereon, each of said line and trunk link frames having switch means operable for establishing call connections between calling ones of said lines and idle ones of said trunks, a plurality of markers each activatable in response to a line link frame bid for operating said switch means to establish said connections, a plurality of sequential gating circuits, each one of said circuits serving an individual one of said classes-of-call and comprising means for comparing the number of said trunk link frames having at least one idle trunk for serving said individual one of said classes-of-call with the number of said line link frames gated to bid for service by one of said markers on the same individual one of said classes-of-call, and means for sequentially gating each one of said line link frames which has an incoming line with a call within said individual one of said classes-of-call, to bid for one of said markers only after said comparing means indicates that said number of trunk link frames having an idle trunk is greater than the number of said line link frames gated to bid for said markers.

9. An automatic call distributor system according to claim 8 wherein said sequential gating means includes scanner means activatable for sequentially scanning each one of said line link frames to examine when said last-mentioned one of said frames has a calling incoming line terminated thereon, said scanner means being activated by said comparing means only after said comparing means indicates that said number of trunk link frames having an idle trunk is greater than said number of line link frames gated to bid for said markers, and gating circuitry operated by said comparing means under control of said activated scanner means for sequentially gating an examined one of said line link frames having a calling incoming line terminated thereon to bid for said markers.

10. An automatic call distributor system according to claim 9 wherein said sequential gating means further includes means for registering when any individual one of said line link frames has an incoming line with a call within said individual one of said classes-of-call, and means controlled by said registering means for cooperating with said activated scanner means and said comparing means to operate said gating circuitry for sequentially gating said individual one of said line link frames to bid for said markers.

11. An automatic call distributor system according to claim 10 wherein said registering means comprises an individual relay register for registering calls waiting marker service for each one of said line link frames, said gating circuitry includes an individual gate relay for each one of said line link frames, and said scanner means includes a relay arrangement activated by said comparing means for sequentially cooperating with each said relay register to operate each said gate relay of one of said line link frames having a calling one of said incoming lines terminated thereon, and each said operated gate relay being responsive to gate said last-mentioned one of said line link frames to bid for said markers.

12. An automatic call distributor system according to claim 8 further comprising means activated by said trunk link frames for indicating when said last-mentioned frames have at least one idle trunk terminated thereon, and means operated by said indicating means for accumulating the number of said last-mentioned frames having at least one idle trunk terminated thereon.

13. An automatic call distributor system according to claim 12 wherein said indicating means comprises an individual relay register for each one of said trunk link frames and being operated by said last-mentioned one of said frames for indicating the availability of a trunk link frame with at least one idle trunk and said accumulating means comprising a contact arrangement of said relay registers and a plurality of accumulator relays activated one at a time by said contact arrangement to indicate the accumulated number of said trunk link frames having at least one idle trunk.

14. An automatic call distributor system according to claim 13 wherein said comparing means includes a contact arrangement of said accumulator relays and of each said gate relay for comparing the number of gated line link frames with the number of said trunk link frames having at least one idle trunk.

15. In an automatic call distributor system comprising a plurality of line link frames having a plurality of incoming lines terminated thereon, a lesser plurality of trunk link frames each having a plurality of operator positions terminated thereon, each of said line and trunk link frames having switch means operable for establishing call connections between calling ones of said lines and idle ones of said positions, a plurality of markers each activatable in response to a line link frame bid for operating said switch means to establish said connections, the invention comprising means comparing the number of trunk link frames having at least one idle position with the number of said line link frames gated to bid for one of said markers, means for scanning each one of said line link frames for calling lines terminated thereon, means controlled by said scanning means for gating a line link frame with a calling line to bid for one of said markers when said comparing means indicates that the number of said trunk link frames having idle positions is greater than the number of gated ones of said line link frames.

16. In combination, a plurality of incoming link frames for terminating a plurality of incoming lines, a plurality of outgoing link frames for terminating a plurality of outgoing lines, each of said link frames having switch means operable for establishing call connections between calling ones of said incoming lines and idle ones of said outgoing lines, common control means activatable in response to an incoming link fame bid for operating said switch means to establish said connections, the invention comprising means scanning each of said incoming link frames for gating bids by said incoming link frames for said common control means, means comparing the number of gated incoming link frame bids with the number of said outgoing link frames having at least one idle outgoing line, and means controlling said scanning means to stop said scanning when said comparing means indicates that the number of said trunk link frames having idle outgoing lines is less than the number of said link frames gated to bid for said common control means.

17. The combination in accordance with claim 16 further comprising means for further controlling said scanning means to stop scanning when none of said line link frames has a calling line terminated thereon.

18. The combination in accordance with claim 17 further comprising means for registering the identity of each of said line link frames having a calling line terminated thereon, and call waiting means responsive to a registering of a line link frame identity in said registering means for operating said scanning means to effect said scanning.

19. A communication system comprising a plurality of switching frames, a plurality of circuits, common control means for establishing connections between said switching frames and said circuits, means for monitoring traffic at said switching frames requiring connection of said switching frames to said common control means, means for monitoring the availability of said circuits, and means responsive to said first and said second monitoring means for gating a bid from one of said switching frames to said common control means only when the availability of circuits is greater than said traffic at said switching frames.

20. A communication system comprising switching network means including a first plurality of switching frames and a second plurality of switching frames, common control means for establishing connections through said network means between said first and second switching frames, means for monitoring traffic at said first switching frames requiring connection of said first switching frames to said common control means, means for monitoring the availability of outputs on said second switching frames, and means responsive to said first and said second monitoring means for gating a bid from one of said first switching frames to said common control means only when the availability of outputs of said second switching frames is greater than said traffic at said first switching frames.

21. A communication system comprising
switching network means including a first plurality of switching frames and a second plurality of switching frames,
a plurality of common control means for establishing connections through said network means between said first and second switching means,
first means for monitoring said first switching frames for determining the number of said first switching frames having traffic thereat bidding for connection to one of said common control means,
second means for monitoring said second switching frames for determining the number of said second switching frames having at least one available output for said traffic, and
means responsive to said first and second monitoring means for gating a request for one of said common control means from one of said first switching frames only when the number of said second switching frames having at least one available output is greater than the number of said first switching frames having traffic thereat bidding for connection to one of said common control means.

* * * * *